United States Patent
Hsu et al.

(10) Patent No.: US 10,245,806 B2
(45) Date of Patent: Apr. 2, 2019

(54) FRICTION REDUCTION FOR ENGINE COMPONENTS

(75) Inventors: Stephen M. Hsu, Germantown, MD (US); Yang Jing, Washington, DC (US); Yufei Mo, Washington, DC (US); Dongyun Hua, Washington, DC (US); Ming Chen, Washington, DC (US)

(73) Assignee: The George Washington University, Washington, DC (US)

( * ) Notice: Subject to any disclaimer, the term of this patent is extended or adjusted under 35 U.S.C. 154(b) by 987 days.

(21) Appl. No.: 14/000,857

(22) PCT Filed: Feb. 21, 2012

(86) PCT No.: PCT/US2012/025949
§ 371 (c)(1),
(2), (4) Date: Mar. 4, 2014

(87) PCT Pub. No.: WO2012/115972
PCT Pub. Date: Aug. 30, 2012

(65) Prior Publication Data
US 2014/0170377 A1    Jun. 19, 2014

Related U.S. Application Data

(60) Provisional application No. 61/445,507, filed on Feb. 22, 2011, provisional application No. 61/445,503, filed on Feb. 22, 2011.

(51) Int. Cl.
*B32B 3/30* (2006.01)
*B05D 5/08* (2006.01)
(Continued)

(52) U.S. Cl.
CPC .................. *B32B 3/30* (2013.01); *B05D 5/08* (2013.01); *C23F 1/02* (2013.01); *F02F 1/20* (2013.01);
(Continued)

(58) Field of Classification Search
CPC .......... F02F 1/20; C23F 1/02; F05C 2253/08; F05C 2253/083; Y10T 428/24851; Y10T 428/24355; B32B 3/30; B05D 5/08
See application file for complete search history.

(56) References Cited

U.S. PATENT DOCUMENTS 4,648,819 A    3/1987   Sakamaki et al.
6,170,454 B1   1/2001   MacFarland et al.
(Continued)

FOREIGN PATENT DOCUMENTS

DE    10 2006 060 920 A1   7/2008
EP         1630396 A2 *    3/2006   ............... F02F 1/20
(Continued)

OTHER PUBLICATIONS

International Preliminary Report on Patentability (PCT/IB/373) and Written Opinion (PCT/ISA/237) dated Aug. 27, 2013 (9 pages).
(Continued)

*Primary Examiner* — Patricia L. Nordmeyer
(74) *Attorney, Agent, or Firm* — Crowell & Moring LLP

(57) ABSTRACT

The present invention relates to techniques for lowering friction between moving surfaces of, for example, an internal combustion engine. Friction reduction is achieved by adding texture modifications to surfaces that come in contact with each other. Texture modifications that reduce friction in accordance with the present invention include dimples of varying geometries and depths ion the surfaces of components. The present invention also relates to the fabrication technique for applying the textures to the surfaces. In another embodiment, the patterned soft mask is applied onto a large surface (flat or curved including cylindrical rollers surfaces) to be followed by electrochemical etching to imprint the textures onto the component. And, in another
(Continued)

embodiment, a diamond-like-carbon (DLC) film may be applied to the turbine component to also reduce friction.

10 Claims, 22 Drawing Sheets

(51) Int. Cl.
   *C23F 1/02* (2006.01)
   *F02F 1/20* (2006.01)
(52) U.S. Cl.
   CPC .... *F05C 2253/08* (2013.01); *F05C 2253/083* (2013.01); *Y10T 428/24355* (2015.01); *Y10T 428/24851* (2015.01)

(56) References Cited

U.S. PATENT DOCUMENTS

| | | | |
|---|---|---|---|
| 6,274,206 | B1 | 8/2001 | Turchan et al. |
| 7,104,240 | B1 | 9/2006 | Vuk et al. |
| 7,198,554 | B2 | 4/2007 | Livingston |
| 2003/0021711 | A1 | 1/2003 | Klink et al. |
| 2008/0248214 | A1 | 10/2008 | Nie et al. |
| 2010/0288222 | A1 | 11/2010 | Urabe et al. |
| 2018/0264774 | A1* | 9/2018 | Bertoldi .......... B32B 15/01 |

FOREIGN PATENT DOCUMENTS

| | | |
|---|---|---|
| EP | 1 818 530 A1 | 8/2007 |
| EP | 2 050 946 A1 | 4/2009 |
| GB | 2 326 446 A | 12/1998 |
| JP | 2007-46660 A | 7/2007 |

OTHER PUBLICATIONS

English translation of Chinese Office Action issued in counterpart Chinese Application No. 201280010032.9 dated Aug. 24, 2016 (five pages).
European Search Report issued in counterpart European Application No. 12749698.2 dated Jun. 24, 2016 (seven pages).
International Search Report dated Jul. 26, 2012 (Three (3) pages).
Chinese Office Action issued in counterpart Chinese Application No. 201280010032.9 dated Feb. 15, 2016 with English translation (13 pages).
Chinese Office Action dated Jun. 15, 2015, with English translation (thirteen (13) pages).
Office Action issued in counterpart European Application No. 12 749 698.2 dated Mar. 9, 2017 (4 pages).
Gachot et al., "A Critical Assessment of Surface Texturing for Friction and Wear Improvement," *Wear*, 2016 Elsevier B.V., pp. 21-41.
Hsu et al., "Friction Reduction Using Discrete Surface Textures: Principle and Design," Journal of Physics D: Applied Physics 47, 2014, pp. 1-12.
Hsu et al., "Self-adaptive Surface Texture Design for Friction Reduction Across the Lubrication Regimes," Surface Topography: Metrology and Properties 4, 2016, IOP Publishing Ltd., pp. 1-11.

* cited by examiner

| Speed / Load | Low | Medium | High |
|---|---|---|---|
| Low | | | Regime I |
| Medium | | Regime II | |
| High | Regime III | | |

FIGURE 1

| Pattern | Type | Depth, μm | Area ratio, % | Image | |
|---|---|---|---|---|---|
| Baseline_1 | Polished | -- | -- |  | ← 1 |
| Baseline_2 | Large shallow (LS) | 0.9 | 17.5% |  | ← 2 |
| Baseline_3 | Deep elliptical | 2.3 | 7% |  | ← 3 |
| MS_1 | Mixed LS + deep | 1.1 | 7 + 15 |  | ← 4 |
| MS_2 | Mixed LS + deep | 2.3 | 7 + 15 |  | ← 5 |
| MS_3 | Mixed LS + deep | 3.3 | 7 + 15 |  | ← 6 |
| OL_1 | Compound Deep LS | 2.1 0.9 | 5% 17.5% |  | ← 7 |
| OL_2 | Compound of Deep L/S | 2.1 0.9 | 7% 17.5% |  | ← 8 |

201

301    302

FRICTION REDUCTION FOR ENGINE COMPONENTS

This application claims priority to provisional U.S. application Nos. 61/445,503 and 61/445,507, both filed on Feb. 22, 2011. The entire disclosures of both such applications are incorporated herein by reference.

This invention was made with government support under Department of Energy Prime Contract No. DOE/NETL DE-AC26-04NT41817-520.01.04 via Subcontract No RDS 41817M3459 awarded to George Washington University from Research and Development Solutions, LLC. The government has certain rights in the invention.

BACKGROUND OF INVENTION

As crude oil prices soar, energy efficiency in the transportation sector has become especially important. Accordingly, there a very high demand for modern engines and drive trains to improve fuel economy and energy efficiency by reducing frictional losses at various contact interfaces. The present invention may have the benefit of improving fuel economy and energy efficiency by reducing friction between engine components under various operating conditions.

SUMMARY OF THE INVENTION

One aspect of this invention relates to incorporating surface texture designs onto engine component surfaces, which may significantly reduce frictional losses for high-contact pressure regions. Previously, surface texturing had only been used commercially in applications involving two flat surfaces or two conformal surfaces. Specific applications with such surfaces have included, for example, water pump seals in automobiles and seals in pumps. Those applications generally involve high-speed, low-load operating conditions.

FIG. 1 shows the various combinations of speed and load operating conditions. Prior art texture patterns have been shown to be effective in friction reduction under high-speed, low-load conditions (Regime I) but lose effectiveness under other load and speed ranges (in fact, friction rises due to surface contacts and the dimple edge stresses as if the surface becomes rougher) (Regime II and Regime III), The basic principles of surface texture designs as reflected in FIG. 1 are summarized as follows:

(Regime I) hydrodynamic lubrication regime ("HD") (high-speed and low-load)—the effects of textured surfaces are a) enhanced hydrodynamic lubrication with dimples or grooves; b) cavitational pressure lift mechanism under certain conditions; and c) reverse flow induced by dimples or grooves.

(Regime II) elastohydrodynamic lubrication regime ("EHL") (increasing load from HD regime)—a) not all dimple sizes and shapes would reduce friction (they actually increase friction if not implemented properly). The dimples have to induce squeezed film lubrication (wedge effect) or partial kinetic hydrostatic lift lubrication mechanism to effect friction reduction. Therefore, the angle of the dimple edge with respect to horizontal plane, bottom shape, dimple spacing in both x and y directions are important, and potential cavitation lift could also be one of the mechanisms to effect friction reduction.

(Regime III) boundary lubrication regime (much lower speed and higher-load, so the two sliding surfaces touch one another)—the dimples operating in this regime require hydrostatic pressure to be generated by the trapped lubricant to enable the onset of hydrodynamic film lubrication mechanism.

There have traditionally been two common recognitions in the texturing community based on experimental results: 1) only one of the two sliding surfaces should be textured; 2) texture only works in conformal contacting surfaces (such as journal bearings, seals, but will not work on curved surface sliding against another curve surface). The present invention circumvents these two restrictions by selecting the shape and sizing the dimples smaller than the contact width to function properly under these conditions.

Additionally, significant technical barriers for introducing textures to engines have previously existed relating to the lack of low-cost fabrication techniques, which could allow for the application of textures over large areas of surface including, for example, large automotive and diesel engine components, which are made of tool steel or bearing steel, sometimes with additional surface treatment to enhance durability. Accordingly, another aspect of this invention relates to the surface texture fabrication procedure. Conventional microlithography uses rigid masks (typically glass or Mylar) (usually at several millimeter dimensions) and is not capable of fabricating textures on curved surfaces due to the need for a UV exposure processing step. Alternative techniques such as embossing, nanomechanical scratching, nanoprinting, and laser ablation techniques 1) are very expensive; 2) are time consuming; 3) potentially damage the surface resulting in fatigue strength degradation; and 4) are not capable of fabricating complex mixed shape feature patterns in one processing step. Therefore, one of the crucial barriers to the potential widespread application of surface texturing to engine components has been the lack of large area flexible masks that are capable of wrapping around large automotive and diesel engine components for lithography and electrochemical etching.

Another aspect of this invention attempts to resolve the wear problem of textured surface running in occasional boundary lubrication regime by adding a tough thin protective diamond-like-carbon film ("DLC"), specially formulated and processed to have unique combination of physical, chemical, and nanomechanical properties for this application. DLC films can have many variations and traditional DLC films that have been tested do not work under this application. DLC films generally have lower reactivity towards traditional lubricants (containing typical phosphorus antiwear additives such as zinc dialkyl dithiophosphate or trecreyl phosphates). According to an embodiment of this invention, a bonded chemical film contains chemistry that reacts with the DLC film so that the DLC film carries its own lubricant chemistry to make the combination highly durable. At the same time, DLC with bonded chemical films demonstrate highly effective friction reduction in engine components and make the surface textures long lasting. This aspect of the invention can also be used to protect surfaces of non-automotive components as well.

DLC, as used herein, is a generic term describing a class of compositions. There can be thousands of diamond-like carbon films with differing and varying properties and thicknesses, processing techniques (different gaseous atmospheres during deposition), and differing degrees of "filtering" of raw materials vapors and particles. The properties of the DLC film depend strongly on processing methods, processing conditions, the gases used in the sputtering process, and the thickness of the film. DLC films include nanocrystalline diamond particles dispersed in an amorphous carbon matrix. The number of diamond particles in a particular DLC film can be measured using Laser Raman Spectroscopy, as $SP^3$ peak, or any other suitable method. The graphitic matrix is represented by the $SP^2$ peak. The term $SP^3/SP^2$ reflects the hardness and toughness of the film. Not all DLC films can protect textured surfaces. An embodiment of this invention relates to a DLC film that can be used to protect textured surfaces.

The present invention relates to techniques for lowering friction between moving surfaces of, for example, in an internal combustion engine. The present invention generally is directed to reducing friction between parts of an internal combustion engine by introducing texture modifications in the surfaces that come in contact with each other. In a preferred embodiment, these surfaces are engine piston rings, cylinder liners, and their respective pins and bearings. In one embodiment, the surface textures are depressions of specific sizes, shapes, and arrangements. In another embodiment, the surface textures can be of different sized textural shapes that vary depending on the engine operational load and speed.

In one aspect of the invention, a texture pattern is implemented that reduces friction as components move from low-load, high-speed conditions to high-load, low-speed conditions. In this aspect of the invention, dimples act as a wedge, which effectively lifts the surface and causes a decrease in viscous shearing and a corresponding reduction in friction.

Another aspect of the invention relates to surface texture design with the mixture of different surface features shapes and sizes. This type of mixed shape texturing combines textures designed for low-load, high-speed operating conditions and the textures that are designed for high-load, low-speed operations. This type of texture arrangement may be referred to as a multiscale texture. By using elliptical-shaped (typically smaller and deeper dimples), and circular-shaped dimples (typically large size and shallower) the result is enhanced friction reduction for an engine component experiencing variable loads and speeds in its operation (such as a ring liner, cam lifter, etc.). This arrangement may allow for the reduction of friction in engine components during operation when the component experiencing various load and speed ranges.

Another aspect of the invention relates to the surface texture fabrication technique. Such technique may use acid (or alkaline) resistant flexible (soft) large area masks on large area steel engine components with curved surfaces, for example, internal combustion engine piston rings and cylinder liners, cams, lifters, rollers, roller pins, etc. In one embodiment of the invention, the surface textural features and associated pattern are created on the large size of elastomeric polymer film (soft mask) with dimension accuracy. In another embodiment, the patterned soft mask is applied onto a large surface (flat or curved including cylindrical rollers surfaces) to be followed by electrochemical etching to imprint the textures onto the steel engine component.

In one aspect of this invention, a pattern may be created on a soft plastic mask. Starting out with a clean silicon wafer, a self-assembled monolayer ("SAM") of hydrophobic molecules (to prevent sticking) are deposited on the wafer; this is followed by placing a pure silver (Ag) film on top of SAM. A photolithographic process is used to produce the desired texture pattern on the silver film. The patterned silver film is then coated with a hydrophilic SAM layer. On top of the SAM layer, a poly dimethylsiloxane ("PDMS") film is deposited using spin-coating. After baking, the patterned PDMS, i.e., the soft mask, is peeled off from the Si surface.

In another aspect of this invention, the soft mask may be directly applied onto the engine components. The size of the soft mask is only limited by the size of the silicon wafer available (for example, and without limitation, a six-inch, 12-inch, or 18 inch-diameter silicon wafer may be used). The soft mask is very flexible with a typical thickness in the range of 0.1-1.0 mm. The texture pattern on this soft mask may be precisely transferred onto the components without the limitation of size and curvature. The surface textures can then be etched into the surface using conventional electro-chemical etching techniques. The technique of using large size of patterned soft mask overcomes the technical barriers in applying surface texture to engine components.

Another aspect of the present invention relates to surface layers for protecting surface texture from wear and reducing friction between moving surfaces, such as in an internal combustion engine component. This aspect of the invention is directed to protecting the surface textures by introducing thin film or coatings under high-load, low-speed conditions where wear may damage the textures. In one embodiment, the protective layers include wear resistant coating. In another embodiment, the protective layers include bonded chemical film on top of the wear resistant coating to provide long term durability of the textured surface.

In another embodiment of the invention, the engine or machine components are first textured to have small dimples on their surface. The dimples are then coated with a DLC layer. In another embodiment of this invention, the DLC layer is further coated with a reactive chemistry with the DLC layer. (DLC is inert and hence does not react with most antiwear chemistries, such as zinc dialky dithiophosphates or Trecyl phosphates, the two most dominant antiwear additives on the market today). This reactive layer will protect the DLC film and synergistically reduce the friction further.

In another embodiment of this invention, to provide additional impact resistance, common in engine operation or in other applications, after the introduction of the reactive chemistry bonded to the engine component surface, an inert molecule is introduced to the surface by dip coating, such as alkylcyclopentanes, which does not bond with DLC surface. This is to be followed by creating a polymer canopy on top of the mixed molecular assembly. An alkmonomer layer is spin-coated on top of the molecular assembly and UV radiated to form a polymer layer on the surface. This helps to prevent the evaporation of the reactive chemistry and encapsulate the inert molecule underneath, providing a visco-elastic layer. This also helps to achieve enhanced durability and reactivity of the DLC coating with the friction reducing anti-wear additives in the lubricant. This process effectively makes the film become part of the surface structure, and, therefore, it will not be leached out by the lubricant used in the engine or machine, and can function independently.

BRIEF DESCRIPTION OF THE DRAWINGS

FIG. 1 shows surface texture friction reduction technology as a function of speed and load.

DETAILED DESCRIPTION OF THE DRAWINGS

Figure 2:
FIG. 2 shows exemplary surface pattern designs in accordance with an aspect of the present invention.
Figure 2:
Figure 2:
Figure 2:
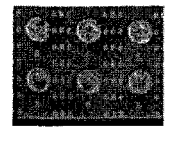
Figure 2:
Figure 2:
Figure 2:
Figure 2:

The surface texturing in accordance present invention may utilize textural patterns on a surface of various shapes, sizes, depth, arrangements, and areal density. The various shapes may include, but are not limited to, circles, ellipses, triangles, parallelograms, and grooves of various depth, edge angles, and several orientation angles with respect to the sliding directions. The size of dimples (depressions) may range from few microns up to hundreds of microns. In some applications, it is advantageous to fabricate multi-scale dimples or protrusions to achieve friction reduction in large components such as marine diesel engines. The typical depth of depression may be in the range of 1-8 microns. Larger depressions provide enhanced hydrodynamic lubrication at high speed. This permits the large surface features to operate effectively under high speed. Small depressions provide extra lift due to the squeeze of lubricant trapped in the depression. This permits the small surface features to operate effectively under low speed and high load conditions. The areal density of large size dimples may be in the range of 15% to 25%. The areal density of small size depressions may be in the range of 5% to 10%. The arrangement of these different depressions may be arranged in an alternating pattern. However, any suitable arrangement of depressions of the same, similar, or different sizes may be used.

As an example of an embodiment of one aspect of the invention, texturing may be applied to a piston ring segment in a typical top piston ring slides over a cross-hatched cylinder liner. The cross hatch marks may be of the same order of magnitude in size and shape to dimples with the cross hatch angle of from 17° to 27° with respect to the horizontal plane of the engine cylinder, and the intersecting angle between the cross-hatching marks may be about 35° to 55°. The height of the cross-hatching lines may be about 3 to 10 μm. This may allow the dimples on the ring surface to work with another "textured" surface.

In an exploratory study, two separate individual patterns were incorporated onto a surface at the same time: one large surface texture pattern at or below two microns deep; one elliptical dimple pattern above two microns deep. In this study, the presence of both dimple patterns actually enhanced one and other as the combined pattern achieved much lower friction coefficients under both low loads and high loads over a wide speed range.

In another study, deep small dimples were fabricated inside of large dimples. As an initial design, a mixed pattern was used, i.e., dual textures of small deep dimples and large shallow dimples with built-in small deep dimples inside large shallow dimples (multiscale texture). This was followed by a totally integrated design (large shallow dimples with small deep dimples inside).

The resulting compound textures were evaluated using the test conditions shown in Table 1, where the test conditions for pin-on-disk and four ball testers are tabulated.

TABLE 1

| Test conditions for pin-on-disk and four ball testers | |
|---|---|
| Four-ball wear tester | Pin-on-disk wear tester |
| Load: | Load: |
| 10 Kg (157 MPa) | 5N (0.15 MPa) |
| 20 Kg (314 MPa) | 15N (0.43 MPa) |
| 30 Kg (470 MPa) | 25N (0.75 MPa) |
| Speed: | Speed: |
| 3500 rpm (1.34 m/s) | 18 rpm (0.038 m/s) |
| 3000 rpm (1.15 m/s) | 36 rpm (0.076 m/s) |
| 2500 rpm (0.96 m/s) | 57 rpm (0.123 m/s) |
| 2000 rpm (0.77 m/s) | 76 rpm (0.160 m/s) |
| 1500 rpm (0.57 m/s) | 96 rpm (0.202 m/s) |
| 1000 rpm (0.38 m/s) | 115 rpm (0.241 m/s) |
| 500 rpm (0.19 m/s) | 129 rpm (0.276 m/s) |
| | 150 rpm (0.314 m/s) |

Examples of various surface texture designs are shown in FIG. 2: polished surface 1; large shallow textures 2; small deep textures 3; mixed large circles with small deep dimples 4; mixed large circles with small deep dimples built-in 5 and 6; compound texture one 7; and compound texture two 8. Differences between compound texture one 7 and compound texture two 8 are that the area densities of the small, deep textures are 5% and 7%, respectively, and the area densities of surface textures being used are 7% for small deep elliptical dimples, and 17.5% for large shallow dimples. Mixed designs 4-6 are intermediate designs where both small and large dimples are present; the large dimples contain small deep dimples at the center.

Figure 3:
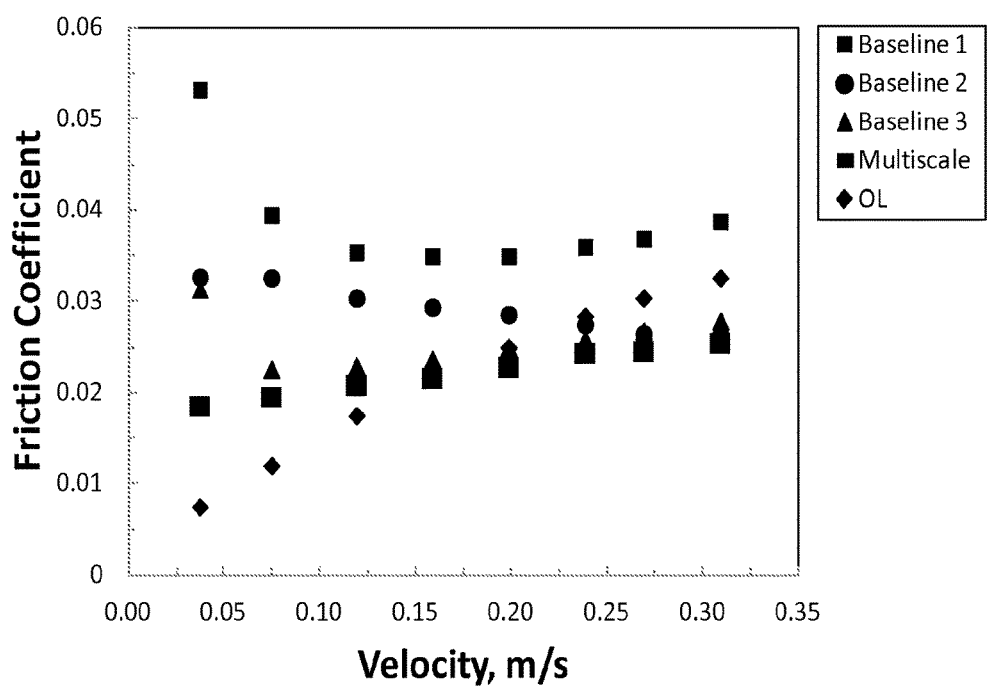
FIG. 3 contains experimental friction coefficient data of pin-on-disk testing under low load condition of 0.15 MPa.
Figure 4:
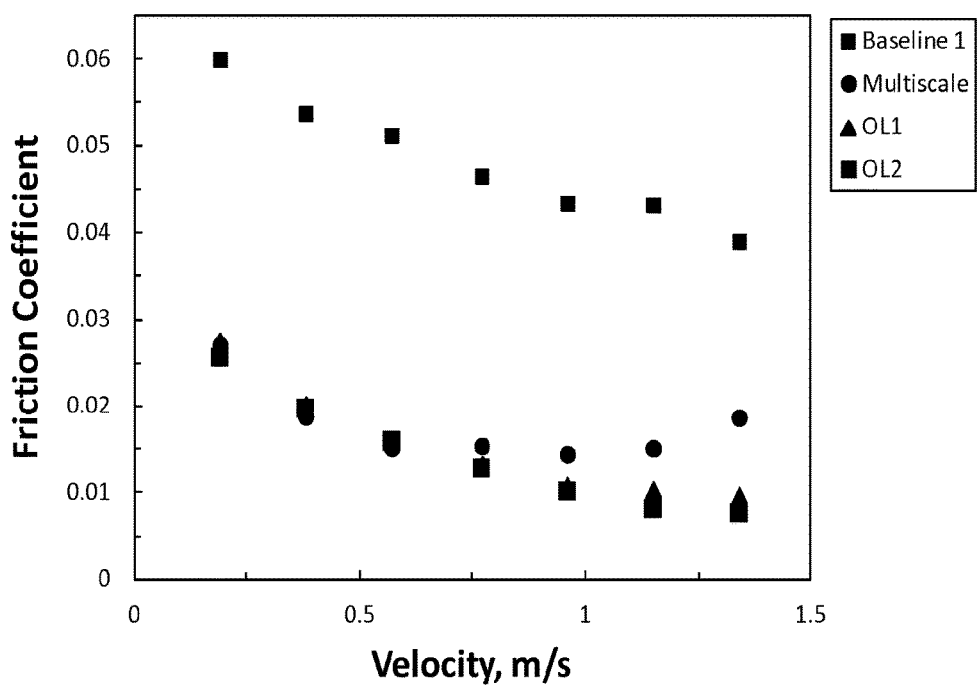
FIG. 4 contains experimental friction coefficient data of four ball testing under high load condition of 157 MPa.

These surface texture patterns were evaluated in low-load, high-speed conditions (run on the pin-on-disk tester), and high-load, low-speed conditions (run on the four ball tester). The experimental results are shown in FIGS. 3 and 4. FIG. 3 shows the friction reduction comparison of five texture patterns under low load conditions (0.15 MPa) ran on the pin-on-disk tester. When the texture patterns are integrated into a mixture of large and small dimples, further friction reduction is observed. FIG. 4 illustrates the comparison of friction reduction characteristics under high load conditions (157 MPa) using a four ball tester. Significant friction reduction (up to 80%) is observed under high-load, low-speed conditions. It has been demonstrated that textural patterns with a mixture of large and small dimples are effective in reducing friction significantly under both high speed/low load and high load/low speed conditions.

In a study for a diesel engine piston ring-cylinder liner application, two different shapes of dimples were incorporated onto a surface to form a pattern: circular-shaped and elliptical-shaped dimples were arranged in an array such that alternating of circle and ellipse with defined areal density. The presence of both dimple shapes and sizes actually enhances one and other. The combined pattern achieves much lower friction coefficients under both low speed and high speed over a wide load range.

Testing on the effect of surface texturing has also been performed using Cameron-Plint reciprocating test rig. The cylinder liner sample is a segment of production cylinder, such that the liner surface consists of cross-hatching lines. The cross-hatched lines are a form of surface texture commonly used in industrial applications. The width of the liner segment is 12 mm and its length is 58 mm. The piston ring segment slides against the liner segment with a stroke length of 12.4 mm. Based on the geometry of testing setup, the apparent contact pressure is in the range of 0.8-6.7 MPa. The equivalent average linear sliding speed ranges from 0.05 m/s to 0.6 m/s for the reciprocating frequencies of 2-24 Hz. White oil (ISO 32 grade equivalent) with 2% Tricresylphosphate (TCP) and 1% antioxidant was used as the testing lubricant. This simple treatment prevented rapid degradation of lubricant without affecting the friction characteristics. For a selected frequency, a step loading procedure was used to apply loads from 30N to 240N with increments of 30N. The test was run for five minutes for each load step, and the average frictional force was recorded. This procedure was repeated for frequencies from 2 Hz to 24 Hz in increments of 2 Hz. The test conditions are listed in Table 2.

TABLE 2

Test conditions for Cameron-Plint test rig
Cameron-Plint test rig

| Load | | Frequency | Speed |
|---|---|---|---|
| 30N | (0.83 MPa) | 2 Hz | (0.05 m/s) |
| 60N | (1.67 MPa) | 4 Hz | (0.10 m/s) |
| 90N | (2.50 MPa) | 6 Hz | (0.15 m/s) |
| 120N | (3.33 MPa) | 8 Hz | (0.20 m/s) |
| 150N | (4.17 MPa) | 10 Hz | (0.25 m/s) |
| 180N | (5.00 MPa) | 12 Hz | (0.30 m/s) |
| 210N | (5.83 MPa) | 14 Hz | (0.35 m/s) |
| 240N | (6.67 MPa) | 16 Hz | (0.40 m/s) |
| | | 18 Hz | (0.45 m/s) |
| | | 20 Hz | (0.50 m/s) |
| | | 22 Hz | (0.55 m/s) |
| | | 24 Hz | (0.60 m/s) |

Figure 5:
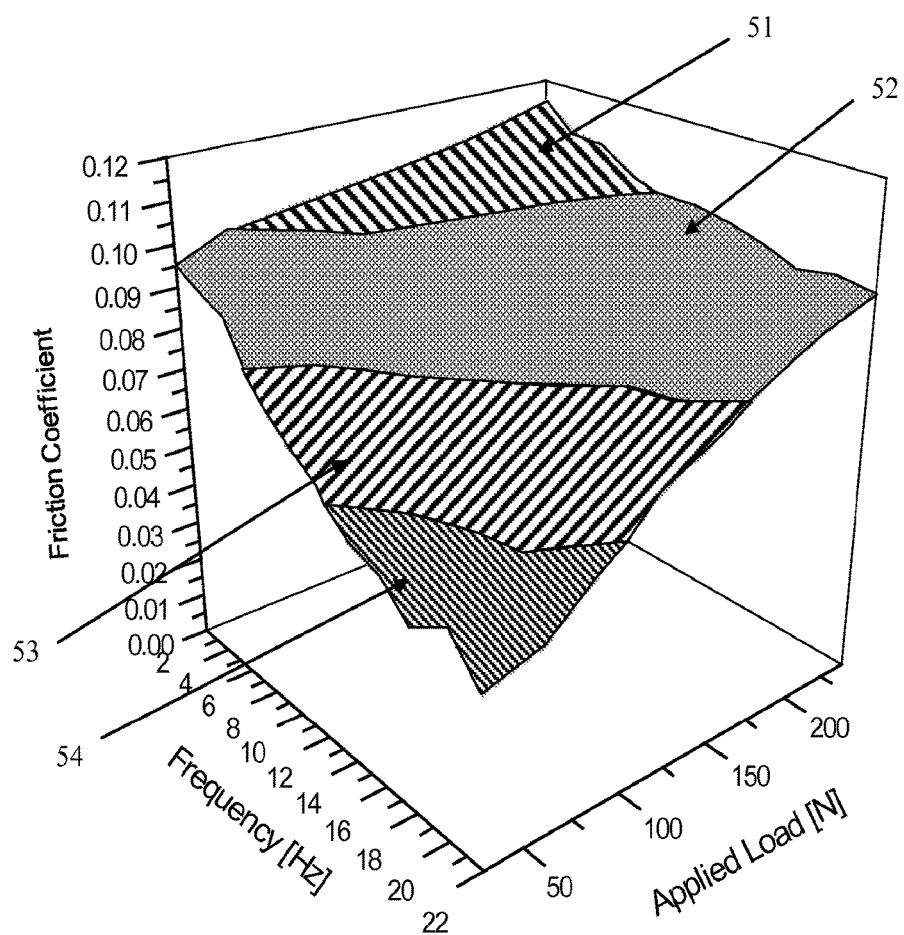
FIG. 5 contains experimental data of Cameron-Plint reciprocating tests using step loading procedure for various frequencies.

One set of the testing results is illustrated in FIG. 5 showing the measured friction coefficient at 40° C. plotted against the applied load and frequencies. The three-dimensional plot illustrates four distinct lubrication regimes: first region 51 represents boundary lubrication regime that the friction coefficient is greater than 0.1; second region 52 represents the mixed lubrication regime that a typical friction coefficient is in the range of 0.07 to 1.0; third region 53 represents the elastohydrodynamic lubrication regime where the friction coefficient is in the range of 0.04 to 0.07; forth region 54 represents the full film hydrodynamic lubrication regime with a friction coefficient around 0.02 to 0.03. The Cameron-Plint reciprocating testing was carried out for textured piston ring specimens at room temperature using the test procedure described above. The un-textured piston ring was also tested at room temperature as baseline for comparison purpose.

As an example of testing performed on an embodiment of the present invention, in a diesel engine piston ring-cylinder liner application, two different shapes of dimples have been incorporated onto a surface to form a pattern: circular-shape and elliptical-shaped dimples were arranged in an array such that alternating of circle and ellipse with defined areal density.

The Cameron-Plint reciprocating testing was carried out for textured piston ring specimens at room temperature using the test procedure described above. The un-textured piston ring was also tested at room temperature as baseline for comparison purpose.

Figure 6A:
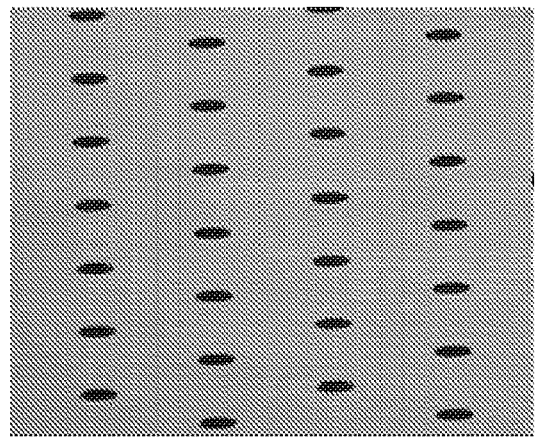
FIGS. 6A, 6B, 6C illustrate surface texture designs of pure ellipse, pure circle and a mixture of ellipse and circle according to embodiments of the present invention.
Figure 6B:
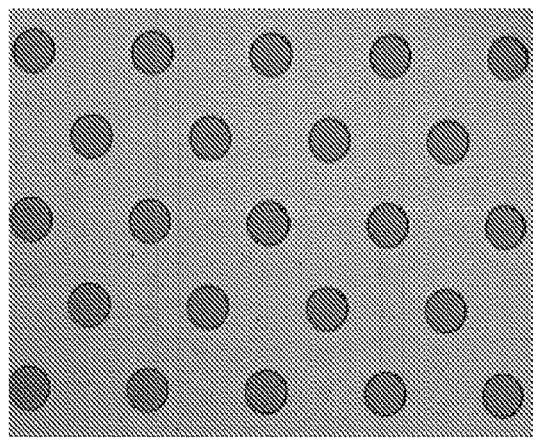
Figure 6C:
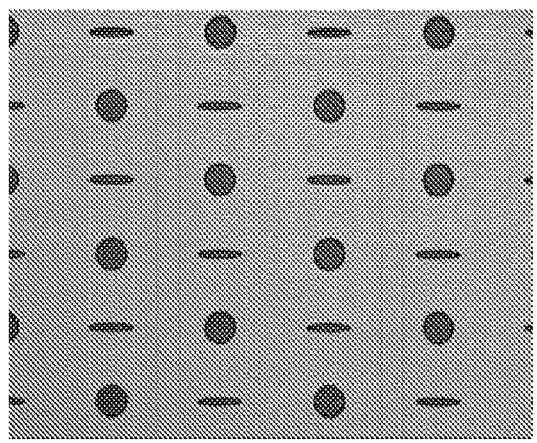

These texture pattern designs are shown in FIG. 6, which shows a pattern of ellipses (FIG. 6A), a pattern of circles (FIG. 6B), and a mixture of ellipses and circles (FIG. 6C). It was found that the presence of both dimple shapes and sizes enhances one and other as the combined pattern achieves a much lower friction coefficients under both low speed and high speed over a wide load range.

Figure 7:
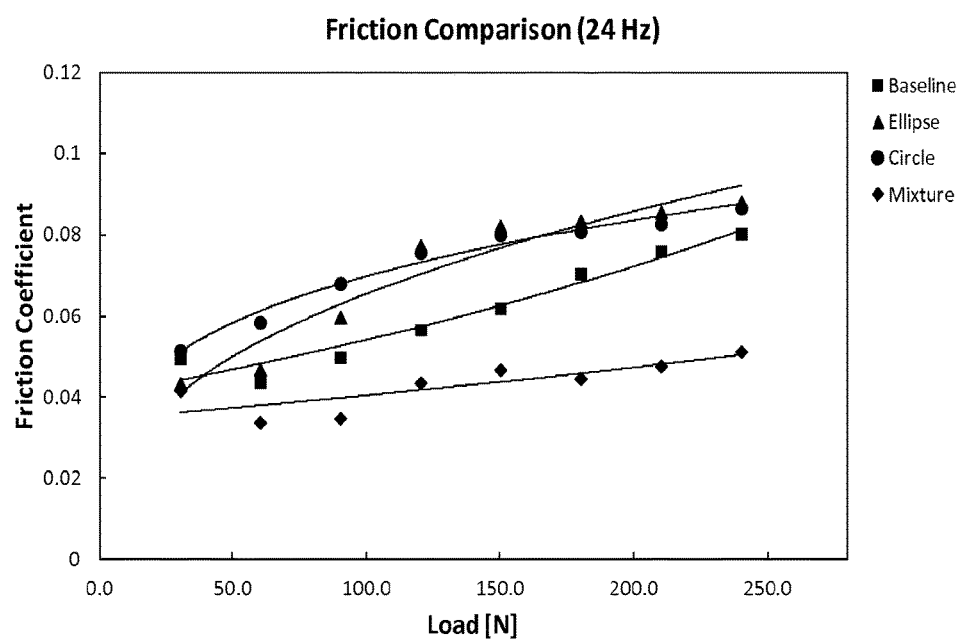
FIG. 7 contains experimental data illustrating the friction reduction of surface texture patterns at different frequencies: pure ellipse, pure circle, mixture of ellipse and circle.

The testing results at frequencies of 24 Hz are shown in FIG. 7. The baseline testing used an un-textured piston ring sample running against a cross-hatched cylinder liner sample. As shown in the figure, a higher friction coefficient is observed for ellipse and circle texture patterns under the condition tested. The design incorporating both ellipse and circle shapes, can reduce friction up to 40%. The mixture design of incorporating both ellipse and circle shapes is therefore effective in friction reduction for a wide range of loads and frequencies.

The surface texturing described herein may be applied by variety of methods; however, as discussed above, the prior art methods have a number of drawbacks. Accordingly, the present invention may use a patterned elastomeric polymer film (soft mask) to create texture patterns to be etched onto real engine component parts made of steel. In one embodiment, this invention relates to a method, or procedure of creating patterns onto the soft mask. In another embodiment, the soft mask may be directly applied onto the engine component to create patterns via electrochemical etching. The engine component may have a rough, wavy, or curved surface of hundreds of millimeters in size. Electrochemical etching may be used to create textures (arrays of micrometer sized dimples of various geometry, shape, and pattern) on the engine component surface.

Soft lithography techniques have been developed to deposit organic molecular assemblies on clean flat surfaces, such as silicon wafer surface for the construction of microdevices (MEMS or NEMS) for sense, compute, and actuate purposes. However, no known techniques have been developed for making masks for large area texturing and on relative "rough" surfaces such as production engine parts, which have high surface roughness and waviness. Engine parts materials also have very complex surface materials composition, such as multi-layer surface layer comprising of metals, ceramic powders, and eutectic multiphase materials. Hence, making photoresist (polymeric material) adhere to the surface, depositing self-assembled molecules, and controlling the bonding of organic molecules to such surfaces are extremely difficult. On rough surfaces, the roughness itself produces varying surface energy levels and defect sites; as a result, depositing uniform molecular layers may not be feasible, making a uniform organic layer (photo-resist deposition) for proper UV exposure time for photolithographic purpose difficult. All these barriers make such soft masks fabrication for electrochemical etching of steel parts unavailable until now.

Figure 8:
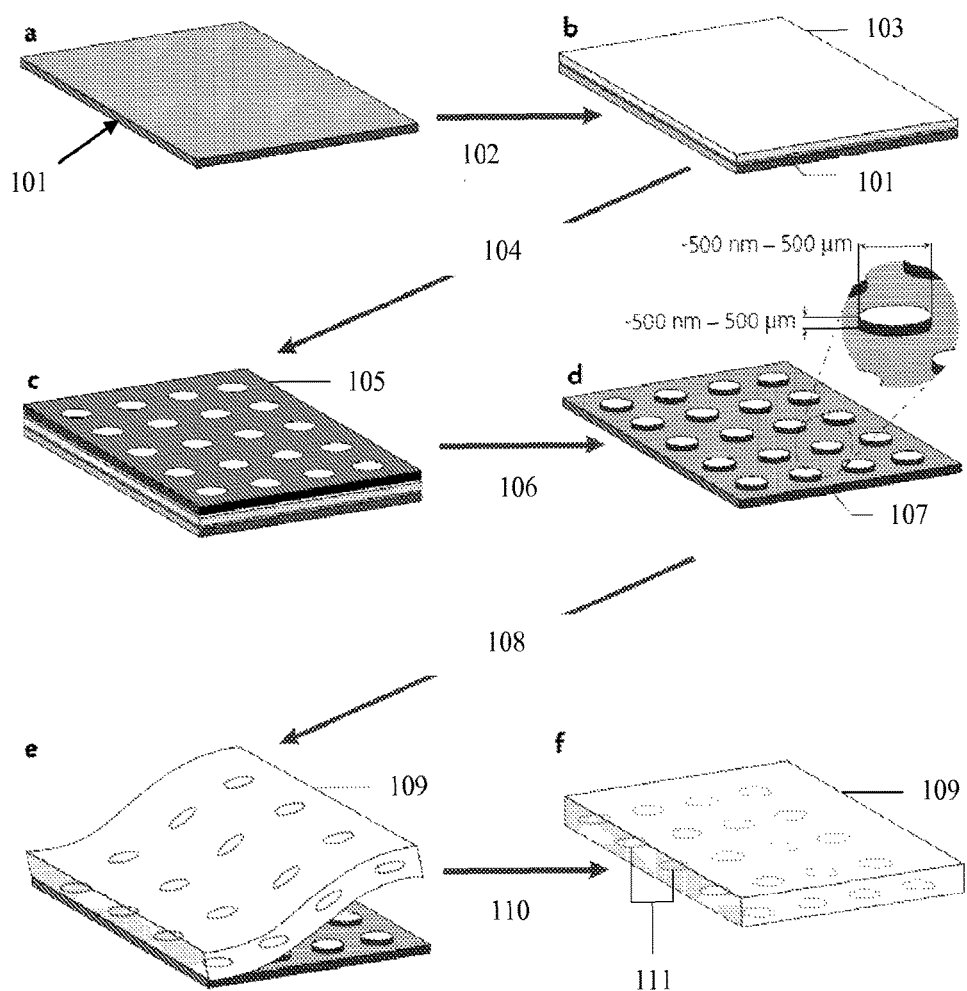
FIG. 8 depicts a schematic diagram of soft lithography process in accordance with an aspect of the present invention.

FIG. 8 shows an embodiment of the present invention that involves a process to fabricate a soft patterned elastomeric polymer film as a mask to pattern "soft materials" (polymers, gels, and organic molecules) on surfaces and the use of a PDMS (poly dimethylsiloxane) mask.

With reference to FIG. 8, the process may start with a silicon wafer 101. Photoresist 103 is deposited onto the silicon wafer 101 at step 102. A mask 105 is added at step 104. UV light exposure is applied, the mask 105 is removed, and photoresist 103 is dissolved at step 106, leaving the resulting master 107. PDMS 109 is poured onto the master 107 at step 108. Curing that may take place at approximately 65° C., followed by peeling away of the PDMS 109, occurs at step 110. The resulting PDMS 109 contains embossed microstructures 111.

Since the PDMS mask can conform to irregular surfaces, the technique, in theory, can be applied to curve surfaces. However, soft lithography has not been applied to large area lithography or used in subsequent etching. Engine components require sizes of hundreds of millimeters and require subsequent UV lithography and chemical etching steps. Also PDMS material is transparent to ultraviolet light; therefore, the PDMS mask cannot be used for UV lithography and etching steps.

In accordance with this invention, photo-lithography may be combined with a thin film deposition technique, and soft-lithography to transfer micro-patterns from a Si wafer coated with Ag film onto a soft transparent PDMS film. To separate the PDMS film from the silicon substrate, a self-assembled monolayer ("SAM") has to be deposited on the film to ensure that the film can be peeled off easily.

Figure 9:
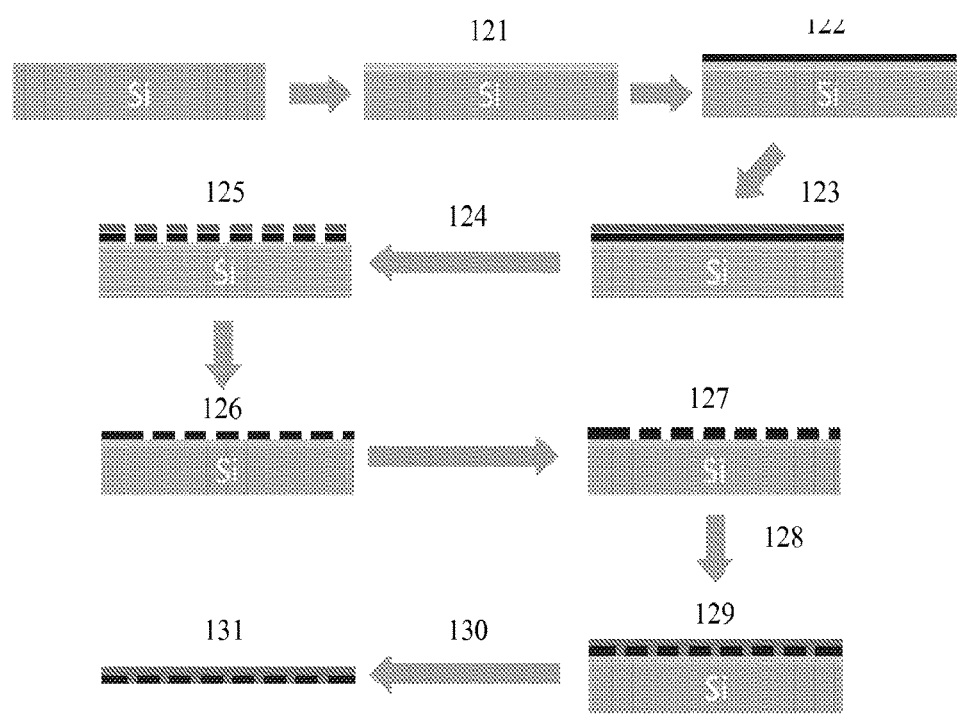
FIG. 9 depicts a schematic diagram of the soft mask fabrication in accordance with an aspect of the present invention.

FIG. 9 illustrates an exemplary fabrication procedure. A hydrophobic SAM layer may be created on the Si wafer (121). On top of the SAM layer, a 100 nm Ag film may be deposited (122) and spin-coated with photoresist materials (123). The silver film-covered silicon wafer then may go through UV lithography (124) and chemical etching (125) steps, followed by photoresist removal (126) to produce the desired texture pattern. Then a hydrophilic SAM layer may be deposited (127). A PDMS mixture may then be spin coated (128) onto the hydrophilic SAM layer covered Si surface with Ag pattern and baked at, for example, 65-70° C. for 3 hours (129). Finally, the cured PDMS film may be peeled off from the Si surface (130) leaving a soft mask (131). Using this technique, large size masks can also be made subjected to the size the silicon wafer and the available processing equipment.

Figure 10:
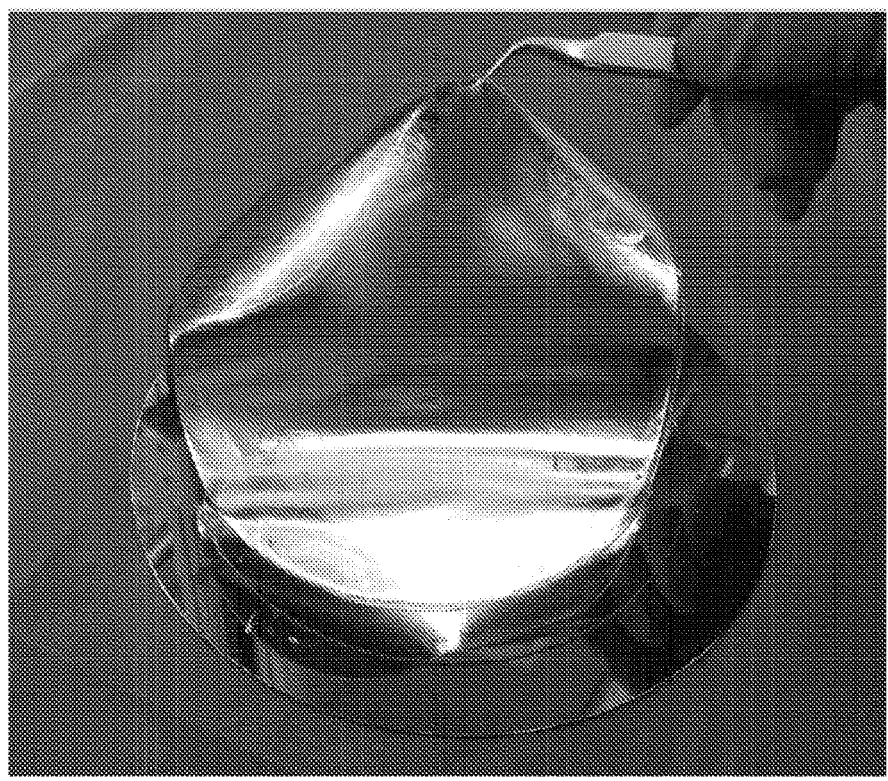
FIG. 10 depicts an optical image showing the peeling of PDMS mask from Si wafer piece.
Figure 11A:
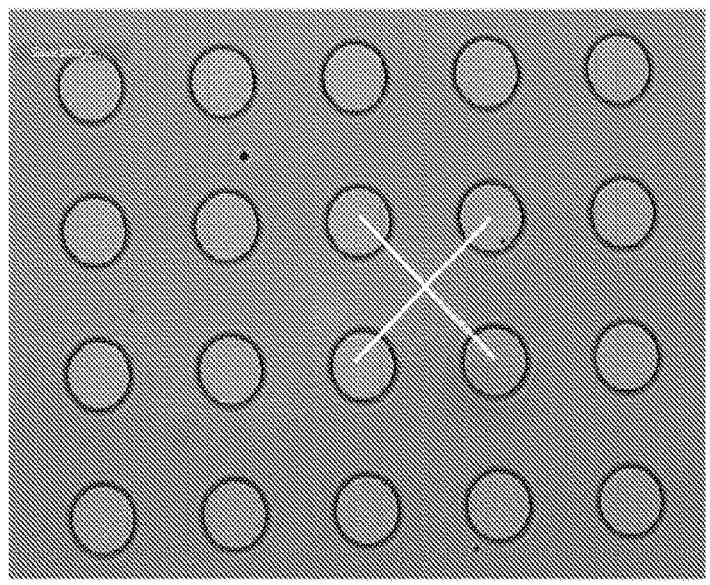
FIG. 11A depicts an optical image showing textural figures on Ag film.
Figure 11B:
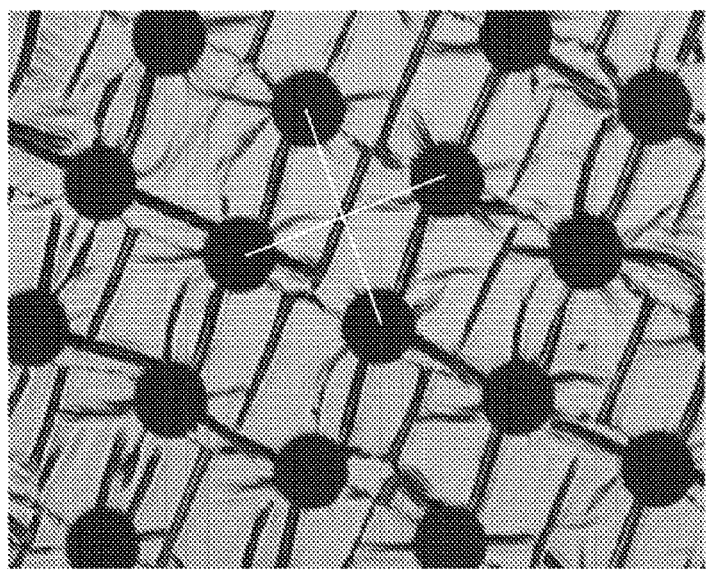
FIG. 11B depicts an optical image showing textural figures on PDMS mask.

FIG. 10 shows the peeling off of the soft mask patterned with Ag layer. It can be seen that the Ag film strongly bonded with the PDMS mask, indicating the successful creation of SAM on the Ag film and the Si surface. A closer look at the microstructure pattern on the PDMS mask (FIG. 11B) illustrates that the micro-pattern on Ag film (FIG. 11A) was transferred onto PDMS mask.

Figure 12A:
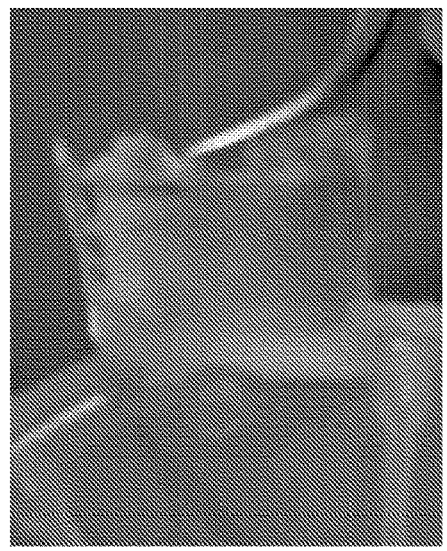
FIG. 12A depicts an optical image showing a transparent PDMS mask with textures.
Figure 12B:
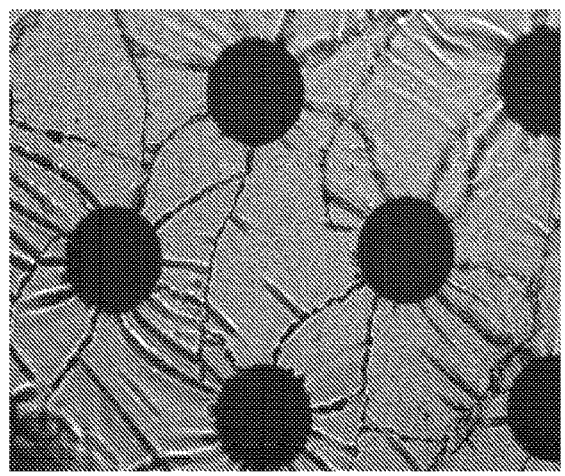
FIG. 12B depicts an optical image showing a texture feature on PDMS mask after the deposition of Ag film.
Figure 12C:
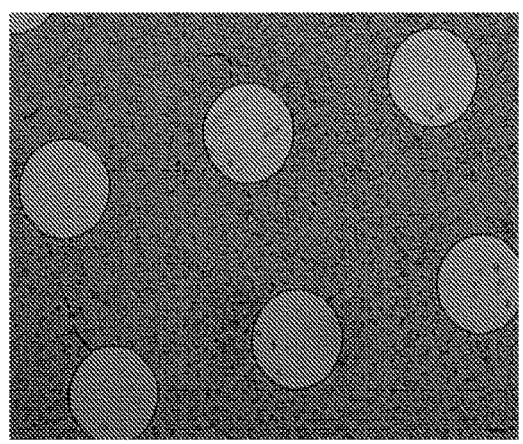
FIG. 12C depicts an optical image showing a texture on steel surface etched from the soft PDMS mask.

The fabricated PDMS soft mask may then be used to fabricate texture patterns on the steel surface. Optical images of a PDMS mask with textures and texture feature on a PDMS mask after the deposition of Ag film are shown in FIGS. 12A and 12B, respectively. As shown in FIG. 12C, fabricated PDMS with Ag could act like a conventional photo mask with the Ag film blocking UV light; therefore, outside the pattern feature, a uniform photo resist covers the steel surface. It should be noted that even though the soft mask was wrinkled due to the difference in the material property between the PDMS and Ag, the pattern feature fabricated on the steel surface did not show obvious changes in size, pitch distance, and shape. It indicates that the wrinkles of the PDMS mask did not influence the photolithography process.

Figure 13A:
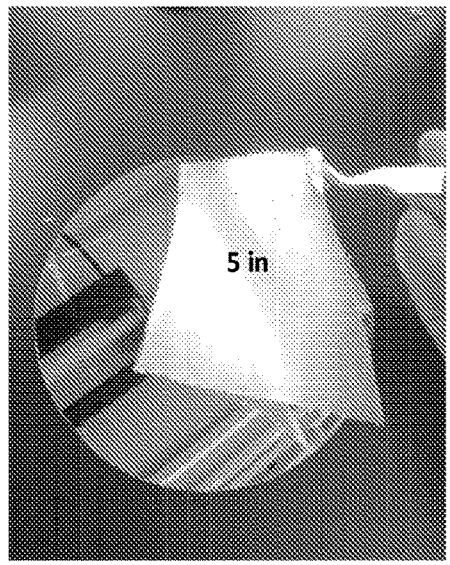
FIG. 13A depicts an optical image showing an overview of the large size photo PDMS mask.
Figure 13B:
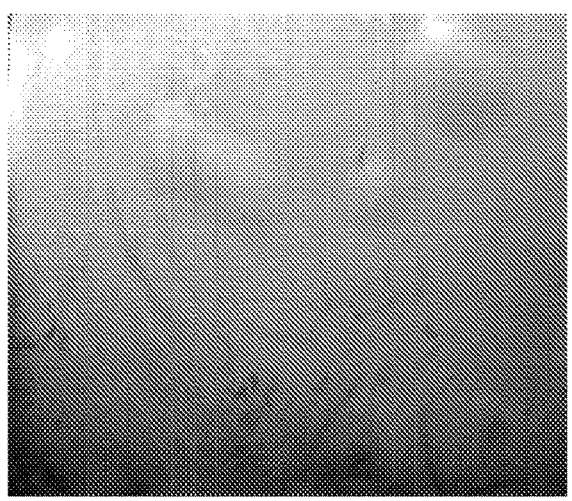
FIG. 13B depicts an optical image showing a magnified image of location A.
Figure 14A:
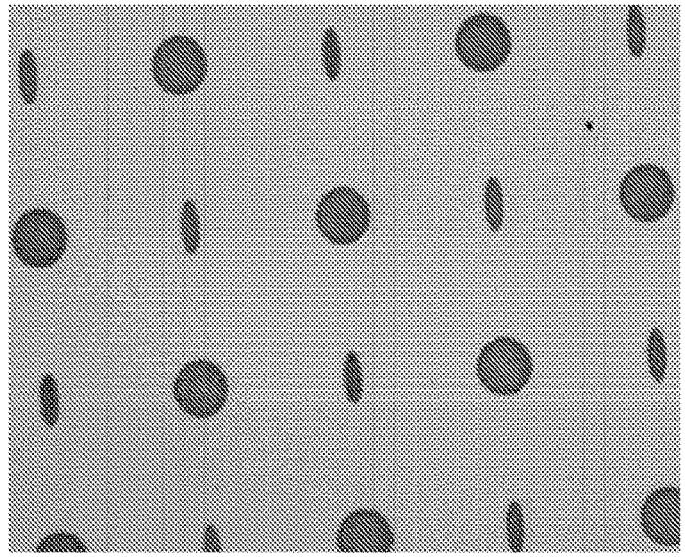
FIG. 14A depicts an optical image showing microstructure of a master pattern.
Figure 14B:
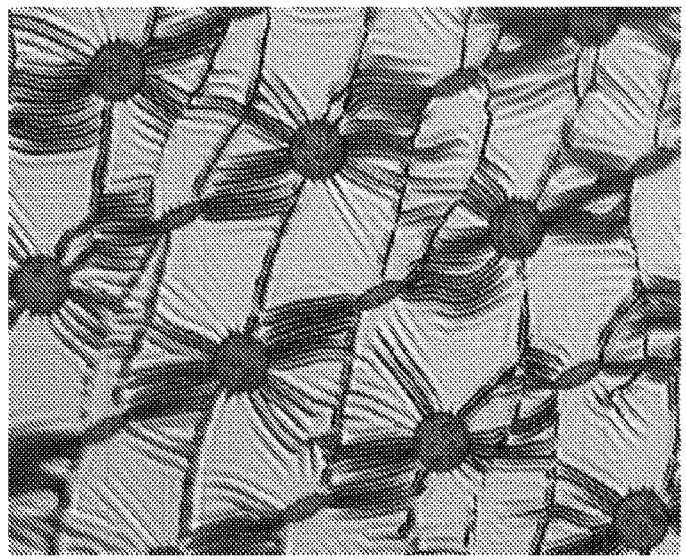
FIG. 14B depicts an optical image showing textural feature on the fabricated PDMS mask.

In an exemplary embodiment, the technique may be performed using a six-inch silicon wafer. FIGS. 13A and 13B show the large soft PDMS mask peeled off from the six-inch Si wafer. A closer view of the microstructure pattern on the PDMS mask, shown in FIG. 14B, indicates that the designed texture was transferred to the fabricated mask. The texture feature on the fabricated PDMS mask was the same with the master textural pattern on Ag film, shown in FIG. 14A. Feature size, pitch distance, and shape remained unchanged.

In another exemplary embodiment, the soft mask technique and electrochemical etching process may be performed on an engine component, i.e., piston ring surface. In an exemplary embodiment, a soft mask can be fabricated according to the procedures discussed above. The detailed steps are described as follows:

Si wafer cleaning procedure
    a Si wafer is immersed in 5:1:1 of Deionized ("DI") water: $NH_3OH:H_2O$ solution for 10 minutes at 75° C.
    rinse with DI water
    after alkaline rinse, the wafer is rapidly immersed in 5:1:1 of DI water:$HCl:H_2O$ solution
    rinse with DI water
    immerse the wafer in 2% HF solution for 10 seconds
    rinse with DI water an dry with a Semitool PSC-101 spin rinse dryer
first SAM film: Dried Si wafer is immersed in a 1 mM dodecyltrichlorosilane in acetone/DI water (5:1) solution for 24 hours
A 100 nm thick Ag film is deposited using Denton Infinity 22 E-beam evaporator at $9.0 \times 10^{-7}$ torr Surface texture pattern fabrication using conventional photolithography procedure Wet chemical etching of Ag film in 1:1 of $HNO_3$:DI water solution Second SAM film: 16-mercaptoundecanoid acid molecules are self-assembled onto the patterned Ag film Polydimethylsiloxane (PDMS) is then spin-coated onto SAM-patterned Ag surface to form a polymer film under a temperature of 70° C. for three hours.

Peel off the patterned PDMS (soft mask) from Si wafer

The hydrophobicity of the modified surface with the first SAM film was confirmed with a 120° water contact angle (FTA32 goniometer). The hydrophilicy of the modified surface with the second SAM film was also confirmed with a water contact angle of 12°.

Figure 15A:
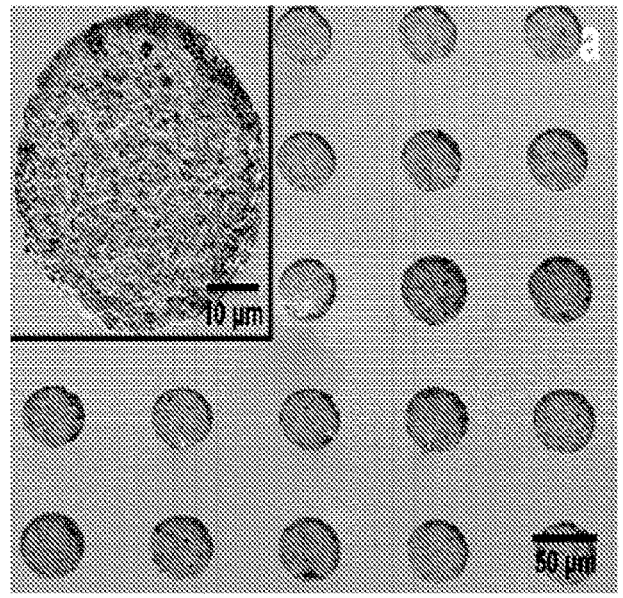
FIG. 15A depicts TEM images showing surface texture of circular dimples on an engine piston ring sample
Figure 15B:
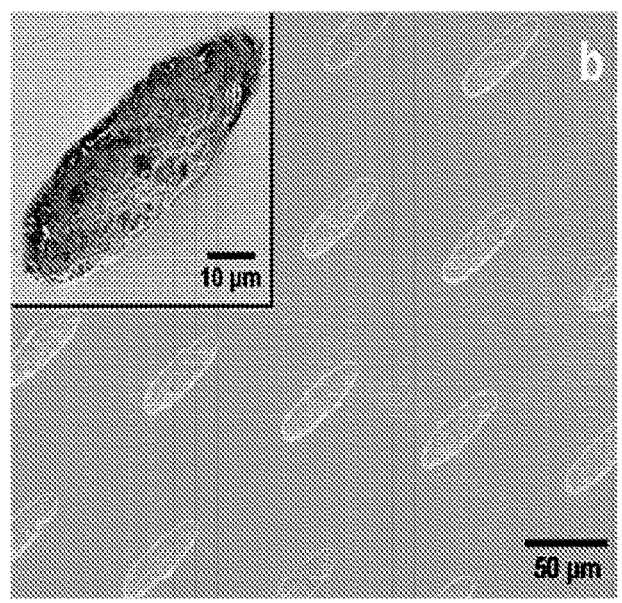
FIG. 15B depicts TEM images showing surface texture of elliptical dimples on an engine piston ring sample.

The PDMS soft mask can then be used to fabricate surface texture patterns on engine piston ring surfaces. The piston ring sample may be cleaned by steps with ethanol, acetone, and DI water, and then dried with nitrogen. A positive photoresist film may then be applied on the cleaned surface by spin-coating process. The PDMS soft mask may then be used to cover the photoresist coated surface and exposed to the UV light to transfer the surface texture pattern onto the photoresist film. The PDMS soft mask may then removed from the surface after the UV exposure. After developing, the surface texture may be fabricated by electrochemical etching process. TEM images of textured piston ring surfaces are shown in FIGS. 15A and 15B.

In another aspect of this invention, a thin film layer, such as a DLC coating, may be applied to the textured surfaces of engine or machine components. There are several parameters to consider for such a thin film: (1) the nature and composition of the film; (2) the thickness of the film; (3) the adhesion characteristics of the film to the substrate; (4) the hardness of the film in relation to the substrate; and (5) the compatibility of the film with lubricant chemistry.

Adding a film to a complicated textured surface may alter the dimension and shape of the textured dimple. This may further alter the friction reduction ability of the textures. If the thickness of the film is too thin, then the durability may be compromised. The nature and composition of the film control the adhesion characteristics of the film to the substrate. It also requires the thin films to have the ability to conform to the textured surface with minimum residual stresses. There are no known films capable of meeting all these requirements.

To determine the sufficiency of different films, testing was performed as follows. A collection of high hardness wear resistant films were deposited on textured surfaces, these include chromium nitride, titanium nitride, carbides, and diamond-like-carbon films. The film thickness ranges from 90 nm to 200 nm thick. A test procedure was developed to test the degree of surface texture protection and the durability of the film. The four ball tester is used and the testing condition is tabulated in Table 1.

TABLE 3

Test condition for four ball tester

| Load | Speed |
| --- | --- |
| 5 Kg | 3000 rpm (1.15 m/s) |
| 10 Kg | 2500 rpm (0.96 m/s) |
| 15 Kg | 2000 rpm (0.77 m/s) |
| 20 Kg | 1500 rpm (0.57 m/s) |

TABLE 3-continued

Test condition for four ball tester

| Load | Speed |
| --- | --- |
| 25 Kg | 1000 rpm (0.38 m/s) |
| 30 Kg | 500 rpm (0.19 m/s) |

Figure 16:
FIG. 16 shows the delamination of hard thin film at the edge of a dimple after four ball testing

The failure observed for thin films typically takes the form of delamination at the edge of the dimple (201) as shown in FIG. 16. The failure mechanism is primarily due to the high contact stresses at the edges of a dimple, especially under high-load, low-speed conditions. Under such stresses, the film covering the dimple typically tends to crack. When shear stresses are also applied, the film tends to delaminate. Once the film delaminates, the film debris will act as an abrasive in the contact; hence, the friction will increase.

In view of the results of such thin film testing, a DLC film was identified as a preferred material to serve as a protection layer applied to textured surface. An example of an embodiment of the DLC film in accordance with this aspect of the present invention was tested. The film thickness ranged from 90 nm to 250 nm and was deposited using a closed field unbalanced magnetron sputtering ion plating system. An interlayer was engineered to increase adhesion between the steel substrate (for example, 52100 steel) and the DLC film. The configuration of the coating targets were Cr with 4.0 A current and C with 3.0 A current. The deposition rates were 20.0 nm/min for Cr adhesive interlayer, 16.8 nm/min for CrC graded layer, and 10.1 nm/min for pure DLC top layer. The bias voltage varied from −60 V to −40 V during pure DLC deposition.

Figure 17A:
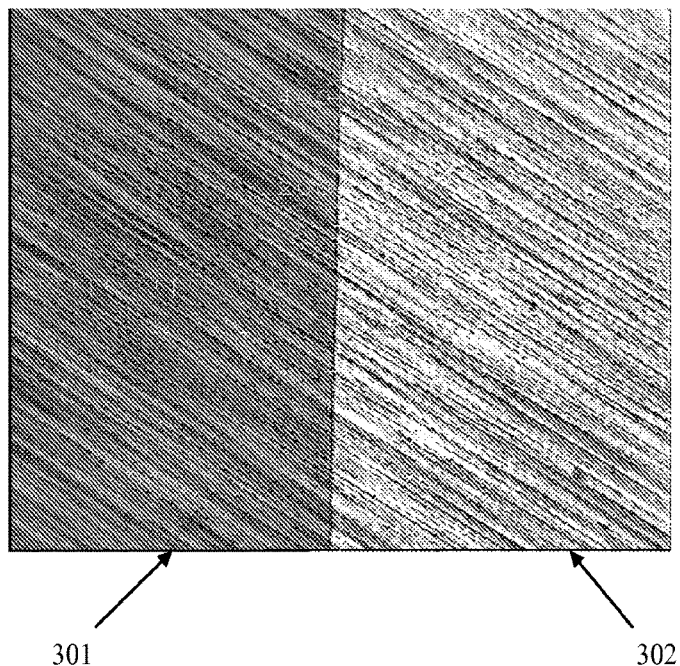
FIG. 17A shows the morphology of the DLC coatings on a steel substrate
Figure 17B:
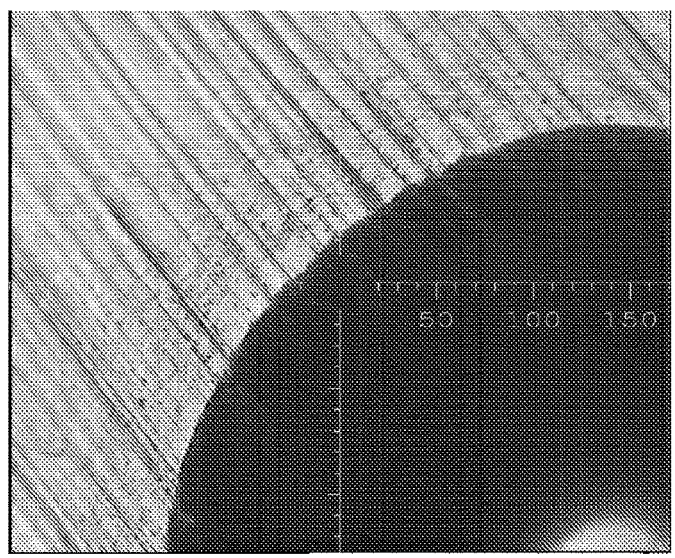
FIG. 17B shows the adhesion of the DLC coatings after indentation by Rockwell 150 kgf FIG. 18 provides the pin (ball) on disk test results showing friction characteristics of chemical films as a function of contact pressures

The DLC coating morphology and adhesion testing result is shown in FIG. 17. FIG. 17A shows a SEM image of the coating morphology of coated (301) and uncoated (302) areas on AISI M42 steel substrate. FIG. 17B contains the result of Rockwell indentation test at 150 kgf and shows no observed delamination around the indent which indicates good adhesion of the DLC coating to the substrate. The hardness of the DLC coating deposited at bias—40V, was measured on a thicker film (~2 micron thick) by Fischer micro-hardness tester at a load of 30 mN. The hardness of the coating was in a range of 12-18 GPa.

In another embodiment of this invention, modifications may be made to the DLC layer that may be applied between moving surfaces of an internal combustion engine over the textured layer. The technique described herein allows for the DLC film to bring its own lubricants into the application it serves. While the internal combustion engine application is specifically discussed, those of ordinary skill in the art would recognize that the film discussed herein may be similarly applied to moving parts in other applications, including, for example, biomedical devices, telescopes, and gears. Traditionally, carbon has been very difficult to lubricate, since it is essentially inert. In the techniques described herein, a process of molecular engineering films to obtain that lubrication is described.

The process is first described generally, followed by more specific examples below. DLC contains a carbon surface and is generally inert. Since only about 30% of the DLC surface is typically considered active, a first molecule is applied to the surface that reacts with that 30% of the carbon on the surface. Next, a second molecule is added by a coating technique, which essentially floats on the surface. Then to prevent the material from evaporating, a polymeric monomer layer is added by a spray deposition technique on top of the combination. Once the polymeric monomer is sprayed, it is activated by UV radiation. The polymeric monomer then becomes polymerized and essentially forms a tent or canopy on top of the surface. An effective thickness of the surface layer is approximately 20 Angstroms. Moreover, 12-18 GPa has been found to be an effective DLC hardness range for the application discussed.

Different type of molecules may be used as contemplated by this invention. For example, for applications such as friction reduction, a hydrocarbon with an alcohol functional group may be used as the first molecule. Then an inert functional molecule, such as Benzene, may be used as the second molecule. Then polystyrene film may be then applied as the polymeric monomer layer on top.

With this coating, the DLC surface now acts in a manner like that of a bumper. Traditional DLC film is hard, but it is also brittle. With this technique contemplated by this aspect of the present invention, the new layer essentially acts like rubber, and the DLC becomes much more robust and useful. Benefits of the combination include the reduction of friction when it is used on surfaces of, for example, engine components as well as, for example, corrosion protection and rust prevention.

A more graphitic DLC film with a 150 nm thickness and 12 GPa nanohardness, contemplated by the present invention, was also tested by the following procedure. DLC coated aluminum based disks (i.e., magnetic hard disks for information storage technology) were used for chemical deposition, encapsulation, and thickness measurement, and were tested for friction on a pin-on-disk tester. The chemical compounds were deposited on DLC coated hard disks using a dip-coating technique. Solutions of 0.5% to 2.0% by weight of various compounds were prepared in cyclohexane or hexane. The solutions were mixed for a minimum of 10 minutes in an ultrasonic bath prior to dip coating to ensure a complete solubilization of the compounds. Deposition was carried out in a dipcoater using a dip speed of 40 to 60 mm/min. The resulting films were then annealed at 165° F. for 10 minutes under argon atmosphere to bind the molecules to the DLC surface while avoiding oxidation. After annealing, the films were washed with 10 ml of cyclohexane or hexane, to remove any molecules that were not chemically bound on the surface. The film was then covered with a thin layer of polymeric monomers and then UV irradiated to encapsulate the chemical film underneath.

Figure 18:
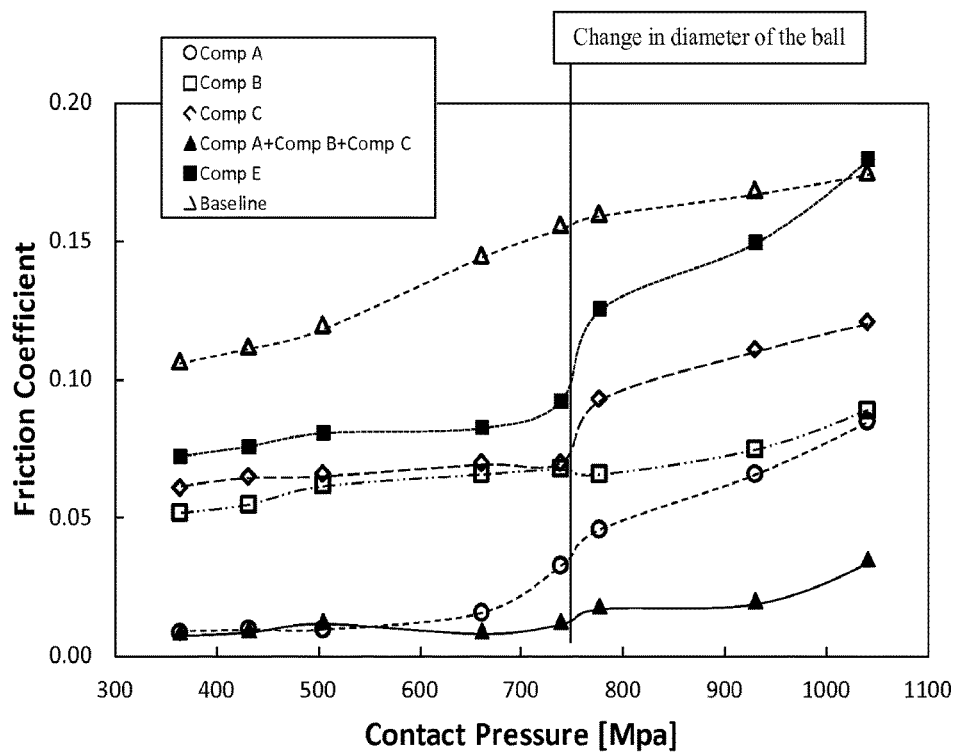

The friction properties of both the encapsulated films and not encapsulated films were tested with the pin-on-disk machine using a step-loading procedure. The load was varied from 1 N to 25 N, and the speed was varied from 0.015 m/s to 0.20 m/s to cover the hydrodynamic and boundary lubrication regimes. To extend the load range of the test, two diameters of the pin (balls) were used (1.5 mm and 6.125 mm). A step loading test was used to evaluate the deposited film. At each sliding speed, eight different loads were applied and the steady state friction for that film was recorded. The testing results are illustrated in FIG. 18 as the friction drops from boundary lubrication conditions (0.08-0.15) to 0.03, typical of hydrodynamic lubrication regime. Mixed compounds (Comp A+Comp B+Comp C) appear to be able to control the friction over the speed and load range much better than a single compound.

The durability of the encapsulated and not encapsulated films was tested using a ball-on-three flats geometry of a four ball tester. The testing procedure may be described as follows:

Stage I: Minicycle Step Loading Sequence:
First cycle: started at 1.15 m/s linear speed (3000 rpm), increased loads from 5, 10, 15, 20, 25, 30 Kg per every 3 minutes (or longer until a steady state friction trace is obtained). The typical time was 3 minutes for each load.

Second cycle: lowered the speed from 1.15 m/s to 0.96 m/s (2500 rpm) and repeated the loading from 5 Kg to 30 Kg steps.

For a total cycle, the speed changed from 1.15 m/s, 0.96 m/s, 0.77 m/s, 0.57 m/s, 0.38 m/s, to 0.19 m/s in an increasingly severe test condition. Minicycle 7 and 8 will basically repeat the condition of cycle 1 and 2.

Stage II: Durability Test (Time to Failure Test Sequence):
To clearly separate the various chemistries and textures, a time to failure test sequence was used. After the eight mini-cycles of testing, if no failure was observed, then the test started at 1.15 m/s speed and 2 kg load for 3 minutes, the load was increased to 5, 10, 20 Kg. At that time, the test continued for one hour until failure. If no failure was observed, the load was increased to 30 kg for an hour, then 40 kg for an hour.

Figure 19:
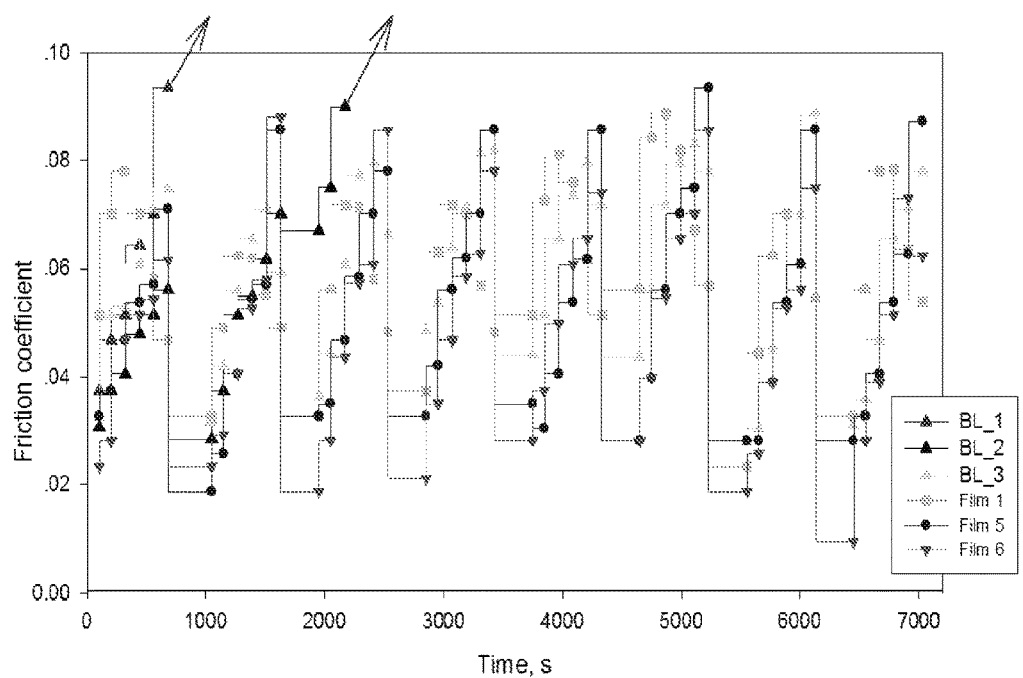
FIG. 19 depicts test results of various bonded chemical films undergoing the cyclic step loading mini-cycles.

FIG. 19 depicts test results of various bonded chemical films undergoing the cyclic step loading mini-cycles. The surfaces without bonded chemical films are as baseline cases. The baseline 1 (BL_1) and baseline 2 (BL_2) were polished surfaces without surface texture. The baseline 3 (BL_3) was textured with dimples. Simple circular dimples were used in Film 5 and Film 6 and coated with bonded chemical films. No dimples were used for Film 1 but bonded chemical film was applied. The baseline cases (BL_1 and BL_2) failed early as indicated by the upward arrows. All the other cases were survived the mini-cycle tests.

Figure 20:
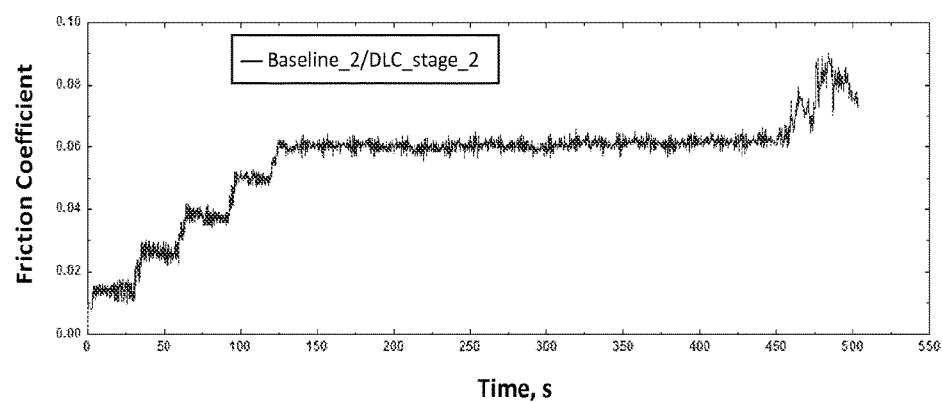
FIG. 20 depicts test results illustrating the time to failure for a surface coated with a DLC thin film.

Following the above mentioned test procedure, if no failure was observed, the sample was subjected to stage II durability test as illustrated in FIG. 20. As can be seen from FIG. 20, a typical time to failure is indicated by the friction trace showing a sudden increase of friction after a long steady friction level. The durability (or time to failure) of the test cases are plotted in FIGS. 21 and 22.

Figure 21:
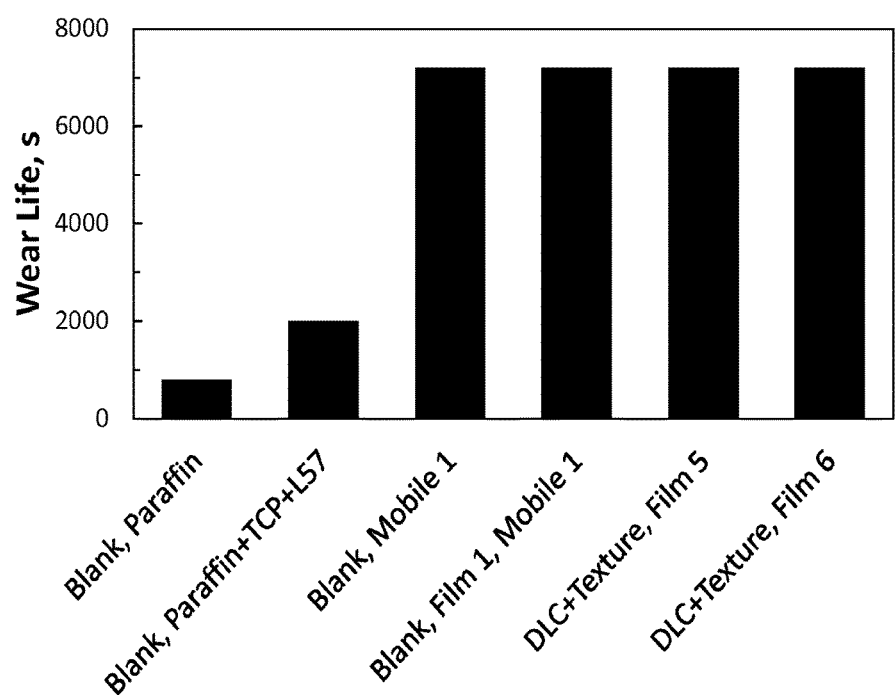
FIG. 21 depicts Stage I test results for a specific combination of chemistry and textures.

The testing results of Stage I for a specific combination of chemistry and textures are summarized in FIG. 21. Baseline of polished surface tested with paraffin oil failed early during the Stage I testing. No failure observed for baseline of polished surface tested with Mobil 1 lubricant. No failure observed for the samples with bonded chemical films.

Figure 22:
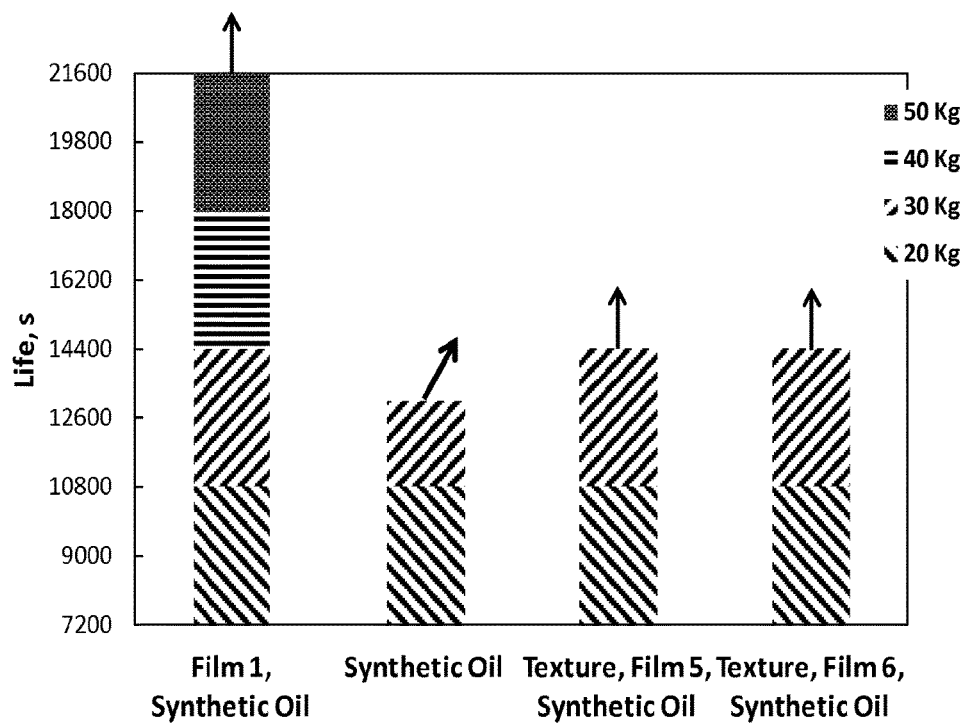
FIG. 22 depicts Stage II durability test results showing time to failure data for the bonded chemical films.

The testing results of Stage II durability test for various bonded chemical films are shown in FIG. 22. After the samples have gone through the 7000 seconds of stage I testing, the test continues at 20 kg and 3000 rpm speed for an hour. The baseline case using synthetic motor oil without bonded chemical film failed during the 30 kg load at about 13000 seconds. Film 1 continued to 30 kg load for one hour, 40 kg load for another hour, and 50 kg load for an additional hour without failure. Films 5 and 6 exhibited lower friction and appeared to be able to continue for much longer time. The concept of built-in bonded film has been successfully demonstrated.

In a specific embodiment, the method for enhancing the DLC film may include the following steps: (a) coating the DLC film with a mixture of reactive chemicals specific to DLC surface such as long chain alcohols, olyel alcohols, glycols, polyglycols of various chain lengths; the film is allowed to anneal at moderate temperatures (70° C. to 160° C. depending on the chemical species) for a period of time (5 to 30 minutes depending on specific molecular structure); (b) solvent washing after annealing to remove any unreacted molecules; (c) adding alkylcyclopentanes or other inert molecules to the surface by dipcoating to fill the unreacted space on the surface; (d) adding polymeric monomers to the top of the surface using spin coating or other means; and (e) radiating the layer of polymeric monomers with UV light of suitable wavelength and time duration to encapsulate the molecular assembly underneath.

Other molecules that may be used separately or in combination with alcohols are Amine O, thiocarbamates, esters, and polyesters, copper oleates, and sulfur leates. Under typical conditions, about 20% to 40% of the DLC surface will be covered with a monolayer or more of these molecules after washing with appropriate solvents. The polymeric monomer may be comprised of polystyrene or polypropylene or other polymer blends suitable for UV irradiation induced polymerization.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A surface texture of an engine component comprising:
a first set of identically shaped dimples arranged such as to form a first periodical pattern, wherein each dimple of the first set of dimples has a first geometry; and
a second set of identically shaped dimples arranged such as to form a second periodical pattern, wherein each dimple of the second set of dimples has a second geometry;
wherein the first periodical pattern is interlaced with the second periodical pattern so that each particular dimple in the first set of dimples is directly disposed between both two pairs of dimples in the first set of dimples immediately adjacent to the particular dimple in the first set of dimples and two pairs of dimples in the second set of dimples immediately adjacent to the particular dimple in the first set of dimples, and each particular dimple in the second set of dimples is also directly disposed between both two pairs of dimples in the first set of dimples immediately adjacent to the particular dimple in the second set of dimples and two pairs of dimples in the second set of dimples immediately adjacent to the particular dimple in the second set of dimples;
wherein the dimples having a second geometry have a smaller surface area than the dimples having a first geometry;
wherein the depth of the dimples of the first geometry is between one micron and five microns and the size of the dimples of the first geometry is between approximately thirty and three hundred microns in diameter, and
wherein the depth of the dimples of the second geometry is between five micron and twenty microns, and the size of the multiple dimples of the second geometry is between approximately ten and fifty microns in diameter.

2. A surface texture according to claim 1, wherein the first set of identically shaped dimples are arranged to an areal density of 15 to 25% of a contact area.

3. A surface texture according to claim 2, wherein the second set of identically shaped dimples are arranged to an areal density of 5 to 10% of the contact area.

4. A surface according to claim 3, wherein friction of the engine component is reduced by 30-90%.

5. A surface texture of an engine component comprising:
a first set of substantially identically shaped dimples arranged such as to form a first periodical pattern, wherein each dimple of the first set of dimples has a first geometry; and
a second set of identically shaped dimples arranged such as to form a second periodical pattern, wherein each dimple of the second set of dimples has a second geometry that is different from the first geometry;
wherein the first periodical pattern is interlaced with the second periodical pattern so that each particular dimple in the first set of dimples is directly disposed between both two pairs of dimples in the first set of dimples immediately adjacent to the particular dimple in the first set of dimples and two pairs of dimples in the second set of dimples immediately adjacent to the particular dimple in the first set of dimples, and each particular dimple in the second set of dimples is also directly disposed between both two pairs of dimples in the first set of dimples immediately adjacent to the particular dimple in the second set of dimples and two pairs of dimples in the second set of dimples immediately adjacent to the particular dimple in the second set of dimples;
wherein the dimples having a second geometry have a smaller surface area than the dimples having a first geometry;
wherein the size of dimples of the first geometry and the size of the dimples of the second geometry are between a few microns to hundreds of microns in diameter;
wherein the depth of the dimples of the first geometry is between one micron and eight microns; and
wherein the depth of the dimples of the second geometry is between one micron and eight microns.

6. A surface texture according to claim 5, wherein the first set of identically shaped dimples are arranged to an areal density of 15 to 25% of a contact area.

7. A surface texture according to claim 6, wherein the second set of identically shaped dimples are arranged to an areal density of 5 to 10% of the contact area.

8. A surface according to claim 7, wherein friction of the engine component is reduced by 30-90%.

9. A surface according to claim 5, wherein the first set of identically shaped dimples are located adjacent the second set of identically shaped dimples.

10. A surface texture of an engine component comprising:
a first set of substantially identically shaped dimples arranged such as to form a first periodical pattern, wherein each dimple of the first set of dimples has a first geometry; and
a second set of identically shaped dimples arranged such as to form a second periodical pattern, wherein each dimple of the second set of dimples has a second geometry that is different from the first geometry;
wherein the first periodical pattern is interlaced with the second periodical pattern so that each particular dimple in the first set of dimples is directly disposed between both two pairs of dimples in the first set of dimples immediately adjacent to the particular dimple in the first set of dimples and two pairs of dimples in the second set of dimples immediately adjacent to the particular dimple in the first set of dimples, and each particular dimple in the second set of dimples is also directly disposed between both two pairs of dimples in the first set of dimples immediately adjacent to the particular dimple in the second set of dimples and two pairs of dimples in the second set of dimples immediately adjacent to the particular dimple in the second set of dimples;
wherein the dimples having a second geometry have a smaller surface area than the dimples having a first geometry;
wherein the size of dimples of the first geometry and the size of the dimples of the second geometry are between a few microns to hundreds of microns in diameter;
wherein the depth of the dimples of the first geometry is between one micron and eight microns;
wherein the depth of the dimples of the second geometry is between one micron and eight microns; and
wherein one of the first and second sets of identically shaped dimples is a set of circular dimples and the other of the first and second sets of identically shaped dimples is a set of elliptical dimples.

* * * * *